FIP8209 UR RE 15,905

Aug. 26, 1924.

Re. 15,905

J. SCHUETTE

AIRSHIP

Original Filed April 25, 1919

Inventor
Johann Schuette.

By Mason Fenwick & Lawrence,
Attorneys

Reissued Aug. 26, 1924. Re. 15,905

UNITED STATES PATENT OFFICE.

JOHANN SCHUETTE, OF ZEESEN-KOENIGS-WUSTERHAUSEN, NEAR BERLIN, GERMANY, ASSIGNOR TO AMERICAN INVESTIGATION CORPORATION, OF NEW YORK, N. Y., A CORPORATION OF MARYLAND.

AIRSHIP.

Original No. 1,416,581, dated May 16, 1922, Serial No. 292,768, filed April 25, 1919. Application for reissue filed July 3, 1924. Serial No. 724,124.

*To all whom it may concern:*

Be it known that I, JOHANN SCHUETTE, citizen of the German Republic, residing at Zeesen-Koenigs-Wusterhausen, near Berlin, Germany, have invented certain new and useful Improvements in Airships (for which I filed an application for patent in Germany March 18, 1916, patent allowed under No. 300,180), of which the following is a specification.

The framework of an airship of the usual rigid type consists essentially of a plurality of longitudinal girders and of rings. Each ring has the shape of a polygon, the number of the sides of which is generally determined by the number of longitudinal girders. The rings themselves are usually internally braced by a number of ties, which, constructed in any suitable manner couple the junction points of the sides of the ring, so that it is practically impossible for them to be deformed. Besides the normal stresses caused by the gas pressure transmitted to them by the longitudinal girders these rings have frequently to carry individual loads, which generally must act on such junction points, which are already under heavy strains, or which by their position are less suited for such purposes. Thereby exceptionally heavy stresses may be produced in some of the rods of such ring bodies, which may, under circumstances, lead to inadmissibly high deformations of the rings.

In order to avoid such danger, the present invention provides that one or several trusses are disposed within the plane of such rings in such a manner that the load is received, not as heretofore by the ring itself, but by said trusses and transmitted by the latter to any desired number of junction points of the ring situated in favorable positions.

Owing to the peculiar character of the strains acting upon such rings of rigid airships forces may appear, which tend to force the ties of the ring or parts thereof from the normal plane. The individual beams of the trusses are either partly or all preferably hinged to the junction points of the sides of the ring so that they may be able to follow any deviation of the plane of the ring.

It is obvious that the trusses may be of any desired form and may be applied to any number of ring members and may be arranged, as desired, either at one part of the ring only or at a plurality of such parts, or may be arranged along the entire circumference of the ring. Thus the individual loads affecting the trusses can be transferred to any desired number of junction points of the ring which may be most favorably situated, for example, in the upper or lower part or at the side parts of the ring, or distributed over the whole circumference.

Figure 1:
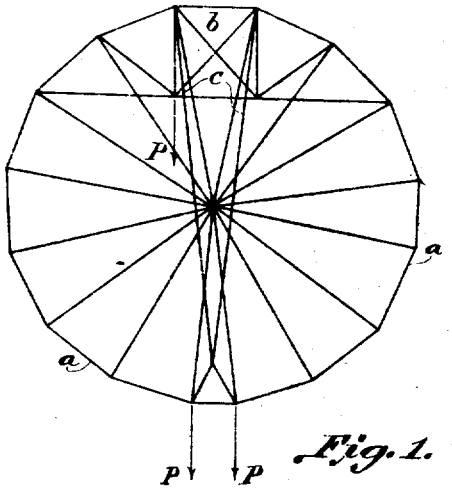
Figure 1 is a diagrammatic view showing the framework of an airship through a section, and showing particularly one position and arrangement of the truss work of the present invention.

In the drawing, *a* indicates the rings, *b* indicates the trusses disposed in the plane of the ring, and *c* indicates the ties for transmitting the load or loads.

Figure 2:
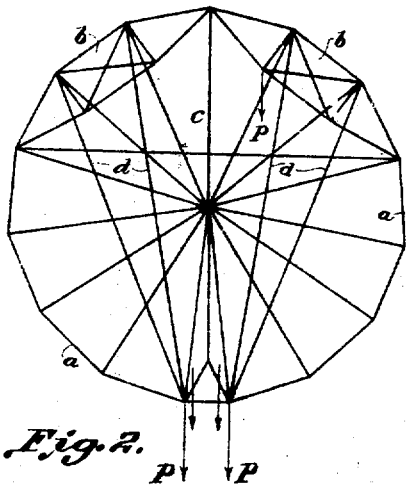
Figure 2 is a similar view showing a different arrangement of the truss work of the present invention.

In Figure 1, a one unit truss is provided, while in Figure 2, a double unit truss is employed. Each of the units in Figure 2 is connected to the ring by three-part trusses, and provided with ties *d* extending downward to the point at which the load is connected thereto.

Figure 4:
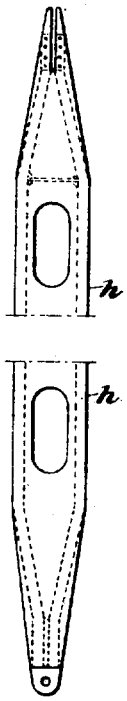
Figure 4 is a detail of one of the beams of the truss work.
Figure 5:
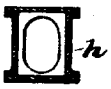
Figure 5 is a transverse section of the beam shown in Figure 4.
Figure 3:
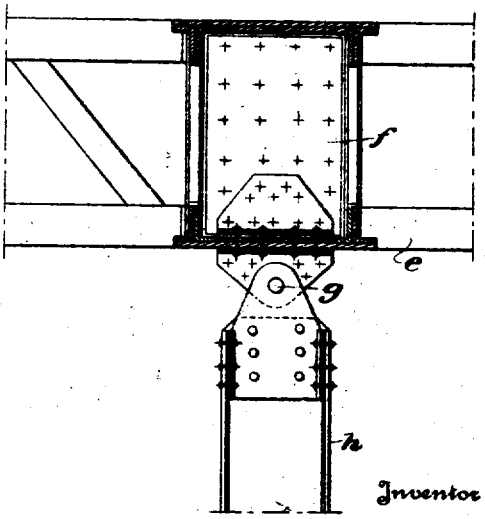
Figure 3 shows a section of a ring which connects the longitudinal girders, showing the junction point of the truss beam with the latter's hinged connection thereto.

In Figure 3, there is shown one of the longitudinal girders *e* and a ring junction point *f*. This view shows how the truss beam *h* is hinged or pivotally connected to the junction point *f*. One form of beam which may be used in the truss is shown in Figures 4 and 5.

What I claim is:

1. A frame work for airships of the rigid type comprising longitudinal girders; rings connected to said longitudinal girders; and load carrying means applicable to each ring comprising truss work having beams connected to a ring at a plurality of points for distributing the load over a predetermined section of said ring.

2. A frame work for airships of the rigid type comprising longitudinal girders; rings connected to said longitudinal girders; and load carrying means applicable to each ring comprising truss work having beams lying in the plane of a ring and connected to said ring at a plurality of points for distributing the load over a predetermined section of said ring.

3. A frame work for airships of the rigid type comprising longitudinal girders; rings connecting said girders; braces connected to the junction points of said girders and rings to assist the rings in sustaining the normal strain; and load carrying means applicable to each ring comprising truss work having beams connected to a ring at a plurality of points for distributing the load over a predetermined section of the ring.

4. A frame work for airships of the rigid type comprising longitudinal girders; rings connecting said girders; and load distributing means applicable to each ring comprising truss work, the latter comprising a plurality of beams connected to the upper portion of a ring at a plurality of points to distribute the load equally over the upper portion of the ring.

5. A frame work for airships of the rigid type comprising longitudinal girders; rings connecting said girders; truss work having beams connected to a ring at a plurality of points; and load carrying beams connected to said truss work, the latter through its beams connected to the ring for distributing the load over a predetermined section of the ring.

6. A frame work for airships of the rigid type comprising longitudinal girders; rings connected to said longitudinal girders; and load carrying means applicable to each ring comprising truss work having beams pivotally connected to a ring at a plurality of points for distributing the load over a predetermined section of said ring.

7. A frame work for airships of the rigid type comprising longitudinal girders; rings connecting said girders; and load carrying means applicable to each ring comprising truss work having beams lying in the plane of a ring and pivotally connected to said ring at a plurality of points for distributing the load over a predetermined section of said ring.

JOHANN SCHUETTE.